Figure 1:
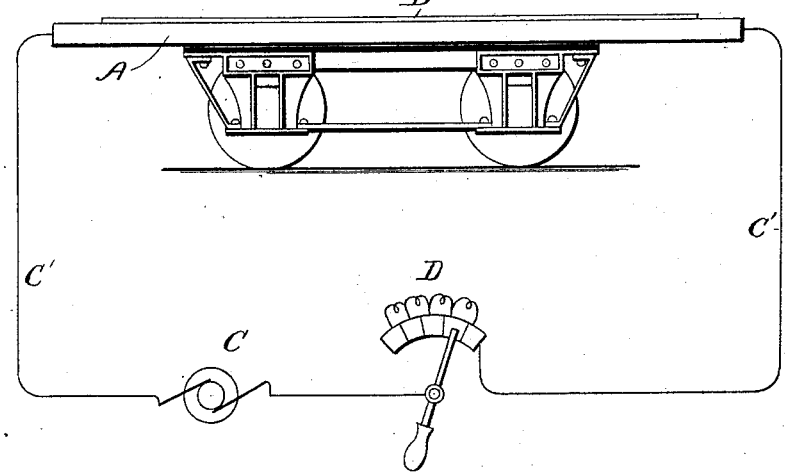

(No Model.) 2 Sheets—Sheet 1.

H. B. NILES & J. B. FORD.
PROCESS OF TREATING PLATE GLASS.

No. 433,254. Patented July 29, 1890.

WITNESSES:
Frank A. Ober
Thomas K. Trenchard.

INVENTOR
Harry B. Niles
John B. Ford
BY W. G. Johnston
ATTORNEY.

(No Model.) 2 Sheets—Sheet 2.

H. B. NILES & J. B. FORD.
PROCESS OF TREATING PLATE GLASS.

No. 433,254. Patented July 29, 1890.

WITNESSES:

INVENTOR
Harry B. Niles
John B. Ford.
BY
ATTORNEY.

UNITED STATES PATENT OFFICE.

HARRY B. NILES, OF UNION SPRINGS, NEW YORK, AND JOHN B. FORD, OF CREIGHTON, PENNSYLVANIA.

PROCESS OF TREATING PLATE-GLASS.

SPECIFICATION forming part of Letters Patent No. 433,254, dated July 29, 1890.

Application filed January 25, 1890. Serial No. 338,137. (No model.)

*To all whom it may concern:*

Be it known that we, HARRY B. NILES and JOHN B. FORD, citizens of the United States, residing at Union Springs, in the county of Cayuga and State of New York, and Creighton, in the county of Allegheny and State of Pennsylvania, respectively, have invented certain new and useful Improvements in the Process of Treating Plate-Glass, of which the following is a specification.

Our invention relates to the manufacture of plate glass. Its object is to provide means and a process for treating the glass to render it transparent after the first "rolling." In the ordinary manufacture of plate glass a billet of molten stock is taken from the furnace and placed upon a cold metallic plate called the "casting-table." A cold roller is then passed over it, which makes it into the form of a plate and of the required thickness. This cold-rolling process, however, forms a thin skin of rough glass on each side of the plate, which takes from the plate its transparent quality and renders it translucent. This thin skin of rough glass is called the "chill," and is caused by reason of the table and roller being cold. It is necessary that the table and roller be cold, for if they were anywhere near the temperature of the molten glass the glass would stick to them and prevent effective work. The glass after being rolled is placed in the annealing-oven, and there subjected to a slow process of cooling, after which it is ground and polished. Thus at no time during the process is the glass transparent until polished. It is thus impossible to produce by this process more than one grade of transparent glass, and that grade must be polished plate-glass.

Our invention is designed to facilitate the process of rendering the plate transparent after the first rolling by removing the rough chill, thus producing a cheap grade of transparent plate glass, for which we think there is a market. We also intend to introduce this treatment into the ordinary process by removing the chill, as hereinafter described, and then grinding the surface smooth. Ordinarily the surface is not only ground smooth, but the entire skin or shell is taken off, which is a very slow and expensive operation.

The invention consists, essentially, in placing the translucent plate upon or against a metallic plate or plates, and passing such a current of electricity through the latter as will heat the glass plate from 700° to 900° Fahrenheit. At these temperatures the glass plate will soften, thus dissolving the chill and rendering the plate again transparent. To get the best product it may be necessary to grind and polish the plate slightly; but by this heating process the chill is removed, thus eliminating the lengthy grinding process and, furthermore, turning out a product which is of considerable value. Electricity is particularly adapted for heating the plates, because by it a uniform temperature over the whole plate may be obtained, and the same may be regulated at will. This cannot be accomplished with gas-jets or other similar heating apparatus.

The apparatus for carrying out our invention is illustrated in the accompanying drawings, in which—

Figure 2:
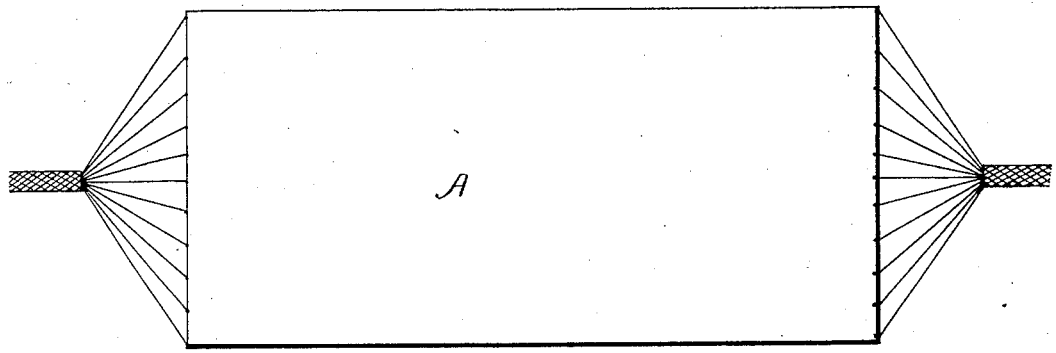
Figure 3:
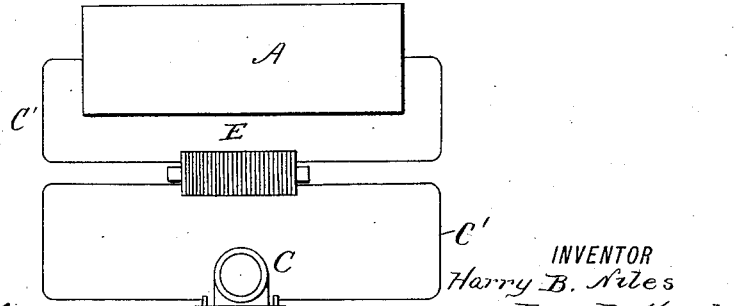
Figure 4:
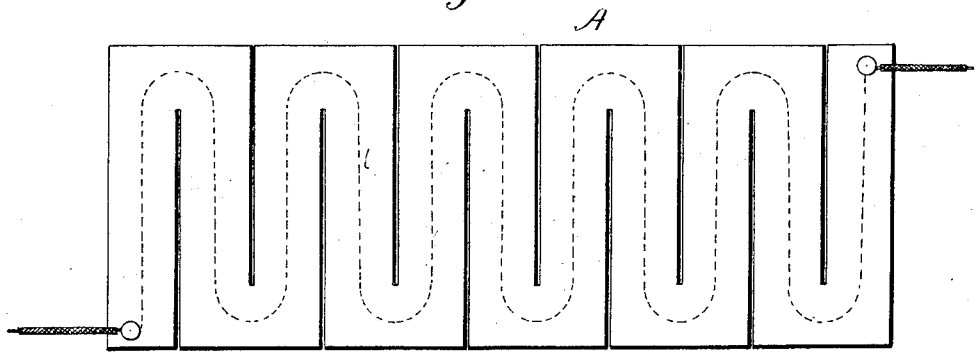

Figure 1 represents a diagram of the electric circuit and a metallic heating-plate mounted upon a truck in the usual manner. Fig. 2 is a plan of a heating-plate, showing connections of electrical conductors for getting an even heat over the plate. Fig. 3 is a diagram of the circuits when an induction coil or converter is used. Fig. 4 is a plan of a modified form of plate, and Fig. 5 a representation of mechanism for confining the plates under pressure while undergoing the heating operation.

A represents a metallic plate or table, upon which the glass is placed after it has been subjected to the first rolling. This plate is supported upon a truck, so that it may be easily moved about the works in the different stages of manufacture. The plate of glass is represented by B and is placed flat upon the plate A. This having been done, the plate A is connected in a circuit C', over which flows a current of electricity from a generator C. The circuit also includes an adjustable rheostat D, by means of which any quantity of current desired may be allowed to flow through the plate. The resistance which the plate offers to the current will cause it to become heated, and through the rheostat the temperature may be raised as fast as necessary until the softening-point of the glass is reached, which is from 700° to 900° Fahrenheit. The softening of the glass causes the translucent skin to disappear and leave the plate in a fairly good transparent state. The product thus obtained is adapted to many uses. To produce the best quality, however, it may be necessary to grind and polish the plate a little; but the extent of this grinding and polishing operation is very small compared to the amount necessary after the ordinary process.

By branching the electrical conductors where they make contact with the plates, as shown in Fig. 2, the current is evenly distributed over the plate and therefore heats the plate uniformly.

In Fig. 3 a converter or induction-coil E is placed in the circuit and an alternating or pulsating generator used. With this arrangement a large current with low voltage may be obtained, and consequently the heating effects of the current may be increased.

Fig. 4 shows the metal plate, provided with a series of slits or kerfs on each side, the slits of the two series alternating with one another and extending nearly but not quite across the plate. The slits may be filled with fire-proof insulating material or may be left open, the air-space forming sufficient insulation. By this construction the sectional area of the path of the current may be increased or diminished, as desired, thus making the resistance whatever is desirable regardless of the size or thickness of the plate. The plates will therefore not require so much current to raise them to a given temperature. It is intended to file a separate application for this form of plate and claim it as a rheostat. Specific claims are therefore not made in this case for it.

Figure 5:
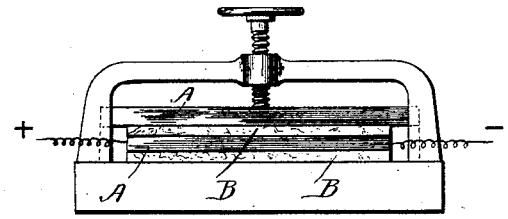

In Fig. 5 we have shown the metallic heating-plate placed between two glass plates and the three then clamped in a press. This may not be utilized in the process; but it will prevent warping, if it becomes necessary.

It will now be understood that in carrying out our invention we place the glass plate in contact with a heating plate or table after it has been treated to the ordinary rolling between cold surfaces, and by passing a current of electricity through the said heating-plate the resistance of the latter is such that a sudden heating of the surface or chill of the glass can be attained, which results in softening it without unduly heating the remainder or body of the glass.

We are aware that it is not new to reheat glass plates after they have been rolled between cold surfaces; but to place such glass plates in contact with a metallic plate and then raise the temperature of the latter by means of an electric current passed through it possesses the advantage of enabling the surface or chill of the glass to be fused or softened without unduly softening the body of the glass, and in this our invention broadly consists.

Having thus described our invention, we claim—

1. The process of manufacturing plate-glass herein described, which consists in first rolling the molten glass into a plate, then placing the glass plate in contact with a heating plate or table, and raising the temperature of the heating plate or table by passing an electric current through it until the glass plate softens.

2. The process of making translucent plate-glass transparent, consisting in heating the translucent glass plate until it softens by bringing it into contact with a metal plate or plates heated by electricity.

3. The combination, with a casting plate or table used in glass-making, of a generator of electricity, and an electric circuit including said generator and said casting-plate.

4. The combination, with a casting plate or table used in glass-making, of a generator of electricity, and an electric circuit including said generator, a rheostat, and said casting-plate.

In witness whereof we have hereunto affixed our names in the presence of witnesses.

HARRY B. NILES.
JOHN B. FORD.

Witnesses as to Niles:
 JAMES KENT,
 ALLEN COOK.
Witnesses as to Ford:
 W. H. CAMP,
 J. C. F. LARDIN.